US011118999B2

(12) United States Patent
Bertagnoli (10) Patent No.: US 11,118,999 B2
(45) Date of Patent: Sep. 14, 2021

(54) METHOD AND INVESTIGATION DEVICE FOR MEASURING STRESSES IN AN AGGLOMERATE STRUCTURE

(71) Applicant: SAFECERTIFIEDSTRUCTURE TECNOLOGIA S.R.L., Rome (IT)

(72) Inventor: Gabriele Bertagnoli, Turin (IT)

(73) Assignee: SAFECERTIFIEDSTRUCTURE TECNOLOGIA S.R.L., Rome (IT)

( * ) Notice: Subject to any disclaimer, the term of this patent is extended or adjusted under 35 U.S.C. 154(b) by 233 days.

(21) Appl. No.: 16/092,534

(22) PCT Filed: Apr. 12, 2017

(86) PCT No.: PCT/IB2017/052113
§ 371 (c)(1),
(2) Date: Oct. 10, 2018

(87) PCT Pub. No.: WO2017/178985
PCT Pub. Date: Oct. 19, 2017

(65) Prior Publication Data
US 2019/0145853 A1    May 16, 2019

(30) Foreign Application Priority Data
Apr. 12, 2016  (IT) .................. 102016000037361

(51) Int. Cl.
*G01M 5/00*    (2006.01)
*G01L 1/20*    (2006.01)
*G08B 21/18*   (2006.01)

(52) U.S. Cl.
CPC ......... *G01M 5/0041* (2013.01); *G01L 1/205* (2013.01); *G01M 5/0083* (2013.01); *G08B 21/182* (2013.01)

(58) Field of Classification Search
CPC ............................ G01M 5/0041; G01L 1/205
USPC ........................................................ 702/42
See application file for complete search history.

(56) References Cited

U.S. PATENT DOCUMENTS

| 3,286,513 | A | 11/1966 | Wasiutynski |
| 5,817,944 | A * | 10/1998 | Chung ............... G01B 7/18 73/768 |
| 6,227,039 | B1 * | 5/2001 | Te'eni ............. C04B 40/0032 73/54.03 |
| 9,833,928 | B2 * | 12/2017 | Bonilla Benegas ...... B60P 3/16 |
| 2002/0154029 | A1 | 10/2002 | Watters et al. |

(Continued)

FOREIGN PATENT DOCUMENTS

| DE | 102013008777 | 11/2014 |
| ES | 2353544 | 3/2011 |

*Primary Examiner* — Ricky Go
(74) *Attorney, Agent, or Firm* — Duane Morris LLP; Gregory M. Lefkowitz (57) ABSTRACT

Method and investigation device associated therewith, for measuring stresses in an agglomerate structure including a binder and a bonded substance, comprising the steps of providing, at one or more points on said structure, at least one investigation device able to measure at least three deformations of said investigation device that are oriented relative to one another on three axes, detecting the corresponding at least three deformation measurements, and calculating a stress that is proportional to a combination of said at least three deformation measurements at the corresponding point.

15 Claims, 3 Drawing Sheets

(56) References Cited

U.S. PATENT DOCUMENTS

| | | | |
|---|---|---|---|
| 2004/0025596 A1* | 2/2004 | Tegtmeier | G01L 5/0004 |
| | | | 73/789 |
| 2005/0178209 A1* | 8/2005 | Kim | G01N 3/60 |
| | | | 73/803 |
| 2012/0210780 A1 | 8/2012 | Cheon et al. | |
| 2013/0250278 A1* | 9/2013 | Zhao | G01B 11/162 |
| | | | 356/35.5 |
| 2016/0103114 A1* | 4/2016 | Sakaguchi | G01L 5/0047 |
| | | | 73/803 |
| 2018/0011075 A1* | 1/2018 | Li | G01B 21/32 |

* cited by examiner

METHOD AND INVESTIGATION DEVICE FOR MEASURING STRESSES IN AN AGGLOMERATE STRUCTURE

CROSS-REFERENCE TO RELATED APPLICATIONS

This application is a § 371 national stage entry of International Application No. PCT/IB2017/052113, filed Apr. 12, 2017, which claims priority to Italian Patent Application No. 102016000037314, filed Apr. 12, 2016, the entire contents of which are incorporated herein by reference.

TECHNICAL FIELD

The present invention relates to a method and to an investigation device for measuring stresses in agglomerate structures having the features set out in the preambles of the respective independent claims.

TECHNOLOGICAL BACKGROUND

In the field of investigating structures, a frequent technical problem is related to monitoring the stresses present within the structure.

Measuring a stress within a solid body presents considerable difficulties, and the measurement is usually obtained indirectly by measuring deformations on the outer surface of the elements forming the structure or directly within said structure. The measurement of a deformation is converted to the measurement of a stress by knowing in advance the constitutive equation of the material being measured. This conversion is simple and reliable for linear resilient materials, the mechanical properties of which are: constant over time and uniform in space within the structure itself, precisely known, and subject to low statistical scattering. This category of materials includes for example metals such as steels and aluminium alloys.

Major difficulties occur when it is desired to obtain a stress within a structure of which the material features are neither uniform in space nor constant over time and are generally not precisely known in advance, as is the case for example for all cementitious mixes. Further difficulties occur as a result of the viscoelastic nature of the cementitious material (a feature associated with agglomerates in general), which tends to result in non-constant deformations and stress states both in the short term and in the long term, even as a result of constant applied loads. It is thus found that specific, dedicated detection systems for monitoring and recognising the mechanical behaviour of an agglomerate structure occur.

In this technical field, a relevant document is U.S. Pat. No. 3,286,513 A, which relates to a probe for use in measuring deformations of a concrete element. More particularly, the invention relates to a concrete probe, intended to be incorporated into a concrete element for simultaneously measuring six deformations at a desired point in the concrete.

The elements responsible for measuring the deformations are arranged in a tetrahedral shape, and the extensometers used are glued to said tetrahedral support structure.

It is further important to note that the six detected deformations are related to six locally different contributions.

The extensometers mounted on the tetrahedral structure measure the deformations of the agglomerate, and thus provide data affected by the viscosity of the material and thus do not provide information about the stress state in the agglomerate.

In this technical field, US 2002/154029 A1 describes a system and a method for wireless analyses which are based on a device for detecting the condition of a cementitious structure (the parameters investigated may be both physical and chemical). In particular, it is provided that a wireless signal is transmitted through the walls of the above-mentioned structure. The individual device is further uniquely identified so as to be able to recognise and query it, even among a plurality of similar devices.

It is also appropriate to cite US 2012/210780 A1, which relates to a method and an apparatus for detecting the structural stability of an area of an object which may be rock, cement or soil. The method and apparatus include providing a plurality of electrodes in the area of the object in a depth direction and measuring a micropotential difference by way of electrodes, thus generating a micropotential difference when the filler material is deformed by an applied force. The document does not cite teachings either concerning the relevant stresses or concerning possible interfering viscoelastic behaviours of the system.

DE 102013008777 A1 describes a method for determining the mechanical strains in components, preferably in cement, by way of a measuring body connected to an ultrasound apparatus.

Further, ES 2353544 A1 describes the use of carbon nanofibers for cement structures (for example pastes, mortars, concretes) with the aim of using said composite materials for monitoring the deformations thereof due to external actions without an incorporated or connected sensor. The disclosed method is based on modifying the electrical resistance of the cement/carbon nanofiber composites when subjected to stress.

Further, also in this technological field, it is appropriate to mention, among the solutions most frequently adopted for these investigation steps:

a) flat jacks;
b) deformation meters;
c) concrete stressmeters.

a) Flat Jacks

Systems of this type are generally formed using a flattened shell, for example two sheets of steel welded at the perimeter, containing a fluid (generally oil) of which the pressure is measured by a manometer. Flat jacks typically have a wide, thin shape, and are commonly only used for isolated measurements, as a result of the need to collect information about a predetermined structure: they are actually temporarily inserted into specific cavities formed in the cementitious structures or wall structures to be analysed, and, once the investigation is concluded, they are extracted from the cement structure or wall structure and the cavities are filled with mortar or similar materials so as to reduce the structure stresses due to the removal of the pre-existing material.

The stress acting on the structure in the direction orthogonal to the faces of the jack is obtained by recording the value of the pressure to which the fluid is subjected by way of a complex of hydraulic connections and reading devices.

This technical solution has a number of drawbacks:

- It requires demolition interventions to form the housings for said jacks within the structure.
- The dimensions of the steel sheets, of several tens of square centimetres, may be found to be too invasive for a structure having reduced dimensions and may form weak points which place the structural safety at risk.
- This is a solution typically used in the presence of a human operator who directs the installation, takes the measurements, removes the installation and checks the restoration of the structural damage introduced.

This is not a set of tools typically suitable for being permanently connected to a structure under investigation, since the pressure of the fluid would also have to be kept constant over time at an extremely low tolerance, and the system of hydraulic connections is often incompatible with permanent applications.

b) Deformation Meters

Deformation meters are tools suitable for measuring variations in the distance between two points forming the measurement base. They may be mechanical, electromechanical, electrical, inductive and/or magnetic, optical or laser devices.

The measurement base is generally positioned on the outer faces of the structure to be monitored, and may be of a length ranging from a few millimetres to tens of centimetres.

Depending on the technology in which they are implemented, the tools measure the number of rotations of a gear system, variations in electrical resistance, in magnetic field, in wavelength of a light source or number of waves thereof and in electrical capacitance of a capacitor.

All of the measurements are subsequently traced back to the relative displacement between the two points forming the measurement base. The average deformation on the measurement base can thus be obtained by dividing the relative displacement by the initial length of the measurement base. The stress can subsequently be derived from the deformation if the constitutive equation of the material is known.

Technical solutions of this type have two major drawbacks:

The mechanical features of the cementitious mixes, such as the constitutive equation, are not constant either in space or over time and are not generally precisely known in advance.

Cementitious mixes are viscoelastic in nature, in other words the deformations vary considerably over time (even by amounts greater than 200%), even in the presence of constant stresses, and the viscoelastic equation governing this variation is not generally precisely known in advance.

c) Concrete Stressmeters

Another type of solution provided in the art involves concrete stressmeters (meters for measuring the stress of the agglomerate). These tools can be inserted inside the agglomerate casting, and comprise a porous cup-shaped shell within which a portion of agglomerate of a type equivalent to that of the structure under investigation is held. The shell makes it possible to exchange gas and vapours along the walls of the cup (in this way, it is attempted to make the reaction processes uniform with the moisture present in the structure between the portion inside the container and the surrounding portion), but not mechanical forces, between the agglomerate inside the container and the agglomerate outside the container, whilst mechanical forces can be transmitted between the concrete casting and the agglomerate inside the cup at the base of said cup and on the opposite open side. The agglomerate actually analysed is the agglomerate enclosed within the cup. An example of these industrial products is the Model 4370 concrete stressmeter from Geokon, in which the stresses of the enclosed agglomerate are read by way of a load cell housed at the base of said cup.

This solution has the following drawbacks:

This is a bulky investigation system (the Model 4370 from Geokon has a cylindrical structure of a length of approximately 600 mm and a diameter of approximately 76 mm), and thus requires sufficiently large structures so as to be able to house it, making it only applicable to castings having large dimensions, in which introducing the device does not lead to significant interference in the structural behaviour.

The stressmeter has to be suitably connected within the cementitious structure under investigation during the casting steps, and has to be positioned immediately before casting and filled with the same material forming the casting immediately before being installed, thus interfering with the other construction site operations.

Given the dimensions of the container, suitable for inserting inert constituents of the agglomerate into it, the measurement obtained is not point information, but rather an average over a length of 600 mm. The device thus cannot be used in the case of sensitive stress gradients which affect the dimensions of the device.

BRIEF DESCRIPTION OF THE INVENTION

The technical problem addressed by the present invention is to provide a method and an investigation device for measuring stresses in a structure of an agglomerate which are structurally and functionally designed to overcome the drawbacks mentioned in relation to the cited prior art.

Within the context of said problem, a primary object of the invention is to provide a method and an investigation device suitable for monitoring the safety conditions of an agglomerate structure and detecting potentially dangerous variations therein for long periods.

This problem is solved and this object is achieved by the present invention by way of a method and device implemented in accordance with the claims that follow.

BRIEF DESCRIPTION OF THE DRAWINGS

The features and advantages of the invention will be more readily apparent from the detailed description of a preferred embodiment thereof, illustrated by way of non-restrictive example, and from the associated drawings, in which.

PREFERRED EMBODIMENT OF THE INVENTION

In the drawings, 1 denotes an investigation device as a whole, which is implemented in accordance with the present invention and is suitable for measuring a stress within an agglomerate or cementitious mix structure.

In this context, the term agglomerate refers to a material in which a binder (for example cement, bitumen, lime, polymer resin, etc.) and a bonded substance, generally referred to as an in inert substance (for example sand, gravel, clay, siliceous powders, glass fibres, carbon fibres, aramid fibres, etc.), are present. An agglomerate of this type takes on a fluid form in a first step of use (for example at the point of casting or forming), and subsequently, in a second step, solidifies to take on the form and features of a solid (clear examples of this being concrete, asphalt, various composite materials, etc.)

In particular, within this broad category, cementitious mixes are particularly relevant, which, specifically, consist of a construction material, typically known as a hydraulic binder, which develops adhesive properties when mixed with water: these include, by way of example, cementitious mortars, cementitious, reinforced cementitious, etc.

Preferably, in this context, the term cementitious mix refers to a material in which said binder is cement and said bonded substance, generally referred to as an inert substance, is sand, gravel, clay, etc.

Advantageously, a cementitious mix of this type takes on a fluid form in a first step of use (for example at the point of casting or forming), and subsequently, in a second step, solidifies to take on the form and features of a solid (clear examples of this being concrete, asphalt, various composite materials, etc.)

Furthermore, the term agglomerate or cementitious mix structure refers in this context to constructions which use, in the interior thereof, materials having the aforementioned features, such as bridges, buildings, roads, etc., comprising pillars, columns, beams, walls and similar structural elements.

In particular, the investigation device 1 can be connected to a portion 2 associated with the structure of the agglomerate or of the cementitious mix, which is intended to be placed under investigation and monitored (for example part of a pillar, beam, wall, etc.).

Advantageously, the features of the investigation device 1 disclosed in the following make it suitable for simple and immediate housing within and in direct contact with the portion 2 of the agglomerate or cementitious mix under investigation.

In a preferred embodiment, the investigation device 1 is housed and/or installed during assembly of an iron armature (or of similar technical solutions) of the structure itself, or in any case at any time before the start of the steps of casting or forming the agglomerate or cementitious mix.

Figure 2:
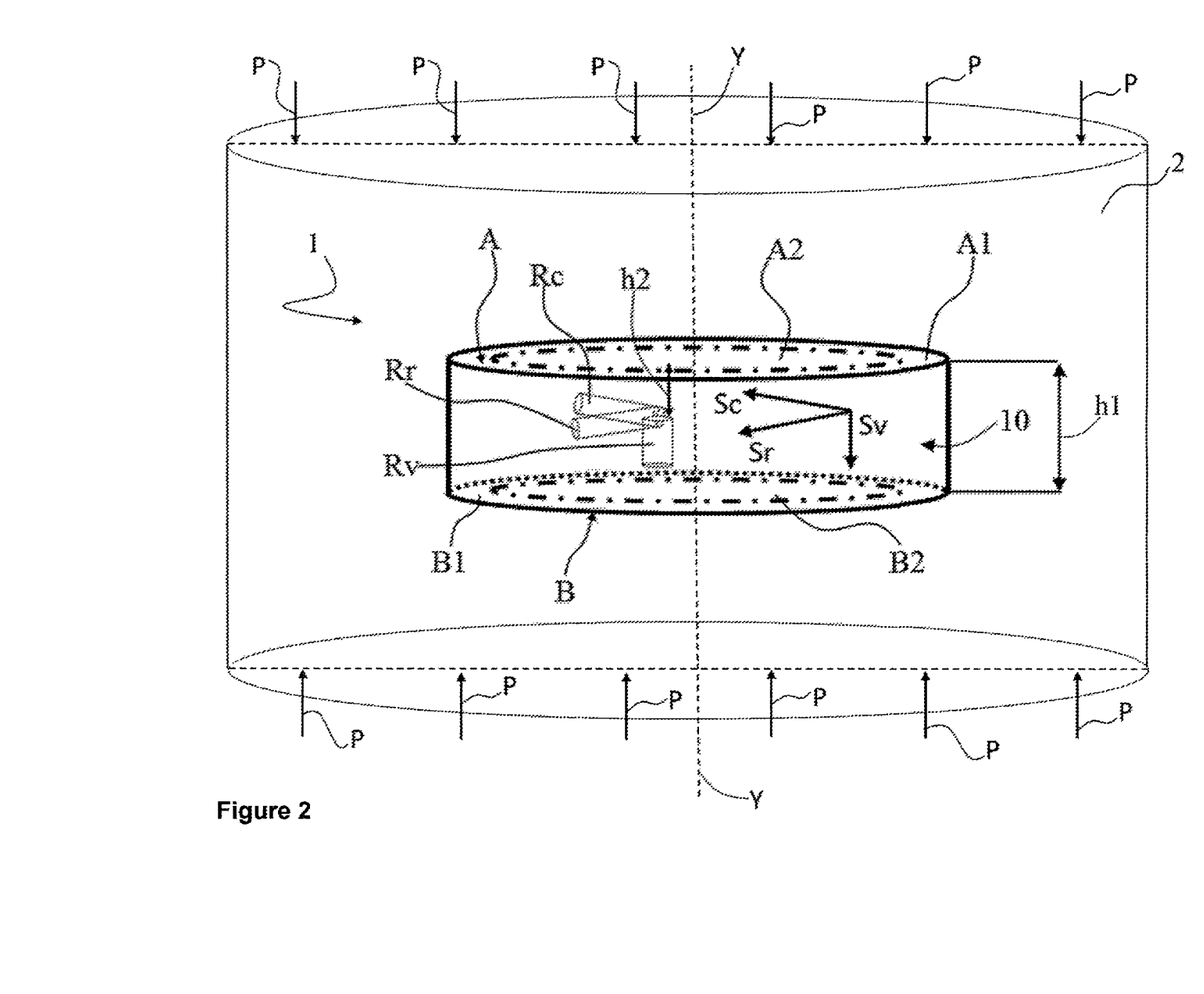
FIG. 2 is a perspective view of an investigation device positioned within a cylindrical agglomerate element representing a neighbourhood of the investigation device subject to a uniformly distributed load P.

Preferably, for a clearer technical treatment of the invention in question, the portion 2 of an agglomerate structure or of the cementitious mix is considered subject to a single stress SYY, acting along the reference axis Y and directly related to an external action acting on said agglomerate structure or of the cementitious mix, for example the uniformly distributed load P (see FIG. 2).

The information stated below is considered applicable both to the agglomerate and to the cementitious mix.

In this context, external action refers both to explicit actions (or direct actions) and to implicit actions (or indirect actions). An action is defined as any cause or set of causes capable of bringing about states of strain and/or deformation in a structure. Actions may be divided, depending on the explanation for them, into:
 direct, due to concentrated forces, fixed or movable distributed loads;
 indirect, due to imparted displacements, variations in temperature and humidity, retraction, pre-compression, bonding failures, viscosity effects.

It is thus advantageously possible to identify a cylindrical neighbourhood of the investigation device 1 shown in FIG. 2, having conditions of axial symmetry around the Y axis in this example.

If the stress SYY is not uniform in this neighbourhood of the device 1, the stress gradients in the space end up being sufficiently small and thus negligible when using an engineering approximation.

In fact, for an expert in the field, it will be simple to select the points of the portion 2 of a structure of agglomerate to be monitored at which the variation in the stress SYY in the neighbourhood of the device is sufficiently small to be considered admissible for engineering purposes.

In this context, the term applied stress means all possible values of the applied stress, including zero, which are dependent on the external actions (for example the load P).

The investigation device 1 can thus be connected to an agglomerate or cementitious mix structure including a binder and a bonded substance, and comprises a resilient deformable body 10 in which at least one deformation meter Ri is arranged, said deformation meter being able to detect at least three deformation measurements E1, E2, E3 that are oriented relative to one another such that a stress SYY inside said deformable body 10 is proportional to a combination of said three deformations measurements E1, E2, E3.

Preferably, the at least three deformation measurements E1, E2, E3 oriented relative to one another are contained in the deformable body 10.

In one embodiment, the at least three deformation measurements E1, E2, E3 oriented relative to one another are deformations of the deformable body 10.

Preferably, the stress SYY inside said deformable body 10 is equal to a single combination of said three deformation measurements E1, E2, E3.

Preferably, the stress SYY inside said deformable body 10 is equal to a single linear combination of said three deformation measurements E1, E2, E3.

As discussed previously, the value of the stress SYY inside the deformable body 10 is equal to a single linear combination of said three deformation measurements E1, E2, E3 and can be obtained in a simple manner from known mechanical formulae. In fact, the device cancels out all the viscoelastic contributions of first and second order, which are generally produced within a concrete structure.

For the purposes of making the proposed technical solution clearer, it would seem expedient to emphasise that the deformable body 10, as well as cancelling the viscoelastic contributions, also has a "filter or screen" action for the contact irregularities between the agglomerate or cementitious mix and the deformable body 10 itself of the investigation device 1.

In this way, the three measured deformations E1, E2, E3 are the deformations of the deformable body 10 due to the structure, and not the deformations of the structure itself; this makes it possible to obtain measurements of deformations inside the investigation device 1 and, if associated with the undisturbed zone A2, not affected by first-order or second-order viscoelastic contributions.

In this context, the term combination refers to a mathematical combination of said values. In a particular case, if the relevant values are associated with linear vector spaces, said combination can be represented by way of a linear combination of the three deformation measurements E1, E2, E3 associated with linear vector spaces.

In a preferred embodiment, the deformable body 10 is made of materials having a modulus of elasticity that is strictly greater than that of said agglomerate structure so as to reduce and make uniform the contact irregularities between the agglomerate and said deformable body 10.

Advantageously, the deformable body 10 is made of materials having chemical and physical properties which are stable over time, capable of lasting inside the agglomerate without deteriorating or changing over time. For example, a metal material (stainless steel or the like) or a ceramic material (alumina or the like) may be used.

This technical solution has the further technological advantage of being able to read the stress SYY more precisely and reliably using materials of which the chemical, physical and mechanical properties are correctly known and predictable over time: in fact, the known technique found in the field does not make it possible to obtain such a high level of predictive precision since it depends on materials of which the features are either completely known or not completely known, or have the potential to change over time.

Optionally, the deformable body 10 may internally comprise elements which exhibit viscous behaviour under load but which have dimensions so as to impart a negligible viscous contribution with respect to the substantially resilient behaviour of the deformable body 10 as a whole.

Preferably, said viscous elements 11 (not shown in the figure) can be made of polymer materials: for example, a layer of polymer material used as a spacer (Kapton) or as a glue (polymer resin).

For an expert in the field, it will be routine to modify and adapt said embodiments using similar materials so as to achieve the objects of the invention.

Figure 1:
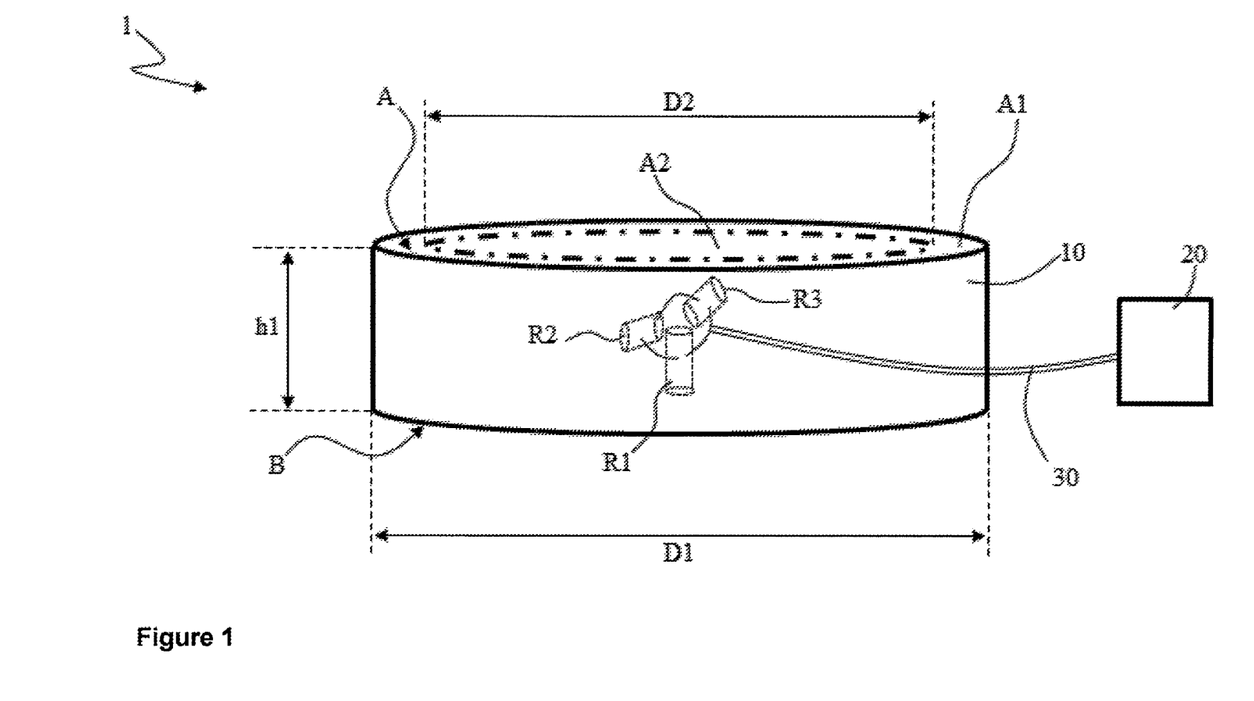
FIG. 1 is a perspective view of an investigation device which can be connected to a structure of an agglomerate.

Referring to FIG. 1, said investigation device 1 comprises a deformable body 10 that has resilient behaviour and is free of viscous characteristics, at least in the context of the admissible strain in the agglomerate structure.

Preferably, the deformable body 10 has purely resilient behaviour in the context of the admissible strains in the agglomerate structure.

In particular, the deformable body 10 preferably comprises two surfaces A and B, the smallest dimension of which is greater than or equal to the maximum nominal diameter of said bonded substance or inert substance contained in said agglomerate, in other words having a minimum transverse dimension (for example the diameter for a cylindrical shape) greater than or equal to the maximum nominal diameter of the bonded substances or inert substances of the agglomerate.

Furthermore, the deformable body 10 has a substantially flattened shape with respect to two prevalent dimensions, so as to obtain an undisturbed zone A2 of said stress SYY inside said deformable body 10, in which zone said at least one deformation meter Ri is arranged.

In fact, the deformable body 10, having said substantially flattened shape with respect to two prevalent dimensions, negligibly interferes with the stress field SYY(XYZ) of the stress SYY orthogonal to the two prevalent dimensions within the body itself, thus generating an undisturbed zone A2 of the stress SYY which is not affected by first-order or second-order viscous phenomena.

In physics, a field is a region of space at every point of which a physical value (depending on the nature thereof, the field will be defined as scalar, vector, tensor etc.) is defined by a suitable law. Said physical value may be a temperature (an example of a scalar field), a force (an example of a vector field: a gravitational, electrical or magnetic field), or a stress as in the present field of application.

In this context, the term negligibly disturbing means that the substantially flattened shape of the deformable body 10 includes possible disturbances in the stress field SYY(XYZ) of the stress SYY which are less than a predefined value. In particular, said predefined value is 10% of the local value of the stress field SYY(XYZ).

In a preferred embodiment, the at least three deformation measurements E1, E2, E3 oriented relative to one another are included in the undisturbed zone A2 and the stress SYY is proportional to a combination of said three deformation measurements E1, E2, E3.

Further, in the present context, a substantially flattened shape preferably refers to three-dimensional structures having a primary extension along two prevalent dimensions with respect to a third: examples may be a prismatic or cylindrical or laminar model (see FIG. 1) having two bases A and B, defined by said two prevalent dimensions and spaced apart along the third dimension by a height h1 that is less than said two prevalent dimensions.

Further, the cylindrical structures described in the present context comprise both regular cylindrical and elliptical cylindrical structures, as well as prismatic structures having a base having any desired shape.

Advantageously, said three-dimensional structures in accordance with a prismatic, cylindrical or laminar model have edges linked via suitable connecting beams suitable for further reducing the possibility of generating second-order effects that disturb the viscosity.

In particular, said substantially flattened shape has a development in accordance with a prismatic or cylindrical or laminar model, in which a dimension ratio R between the smaller of the dimensions of the bases A and B and a height h1 of the prismatic or cylindrical or laminar model is within a predetermined range of values.

In a preferred embodiment, said dimension ratio R is greater than or equal to 10. For example, FIG. 1 shows a deformable element 10 having an extension in accordance with a cylindrical model, in which the two bases A and B are equal, of an external diameter D1 of 30 mm and a total height h1 of 3 mm. In this case, the dimension ratio R ends up being 10.

These embodiments are intended to be exemplary and non-limiting, and can be altered or replaced with similar materials by an expert in the field so as to achieve the objects of the invention.

These conditions relating to the type of material of which the deformable body 10 is made and the shape thereof make it possible for the investigation device 1 to have the following properties:

negligibly interfering with the stress fields (specifically those having components orthogonal to said flattened surfaces) generated in the portion 2 by the external applied actions and by the presence of the sensor itself, negligibly affecting the viscoelastic phenomena in the agglomerate, negligibly affecting the stress variations in the space within the agglomerate due to the irregularities in the matrix itself of the agglomerate, for example the presence of inert substances of which the modulus of elasticity is different from the average modulus of elasticity of the agglomerate and/or of gas bubbles within said agglomerate.

These properties have been verified by way of simulation on finished elements.

Thus, by virtue of the features of the invention, it is possible to calculate a stress SYY which is effectively related to an external action, for example the applied load P, or to variations in the conditions of the structure of the agglomerate or cementitious mix independently of the intrinsically viscoelastic nature of the agglomerate itself.

It is important to note that devices implemented in accordance with the teachings of the prior art tend to disturb the stress field because they have dimensional and structural features which divert the internal force lines relative to a load applied to the agglomerate under examination or, when measuring deformations, affect viscous phenomena in the agglomerate and do not make direct evaluation of the stress SYY possible, regardless of knowledge of the constitutive equation of the agglomerate itself. Alternatively, they simply measure deformations affected by the viscoelastic behaviour of the material.

The deformable body 10 is partially disturbed by two unavoidable phenomena:
  The deviation in the force lines of the stress SYY due to the difference in rigidity between the agglomerate and the deformable body 10.
  The occurrence of viscous phenomena generated in the agglomerate in a neighbourhood of the device as a result of the stress gradients due to the deviation in the force lines of the stress SYY described in the point above and due to the deformable body 10 being free of viscous behaviour.

Figure 3:
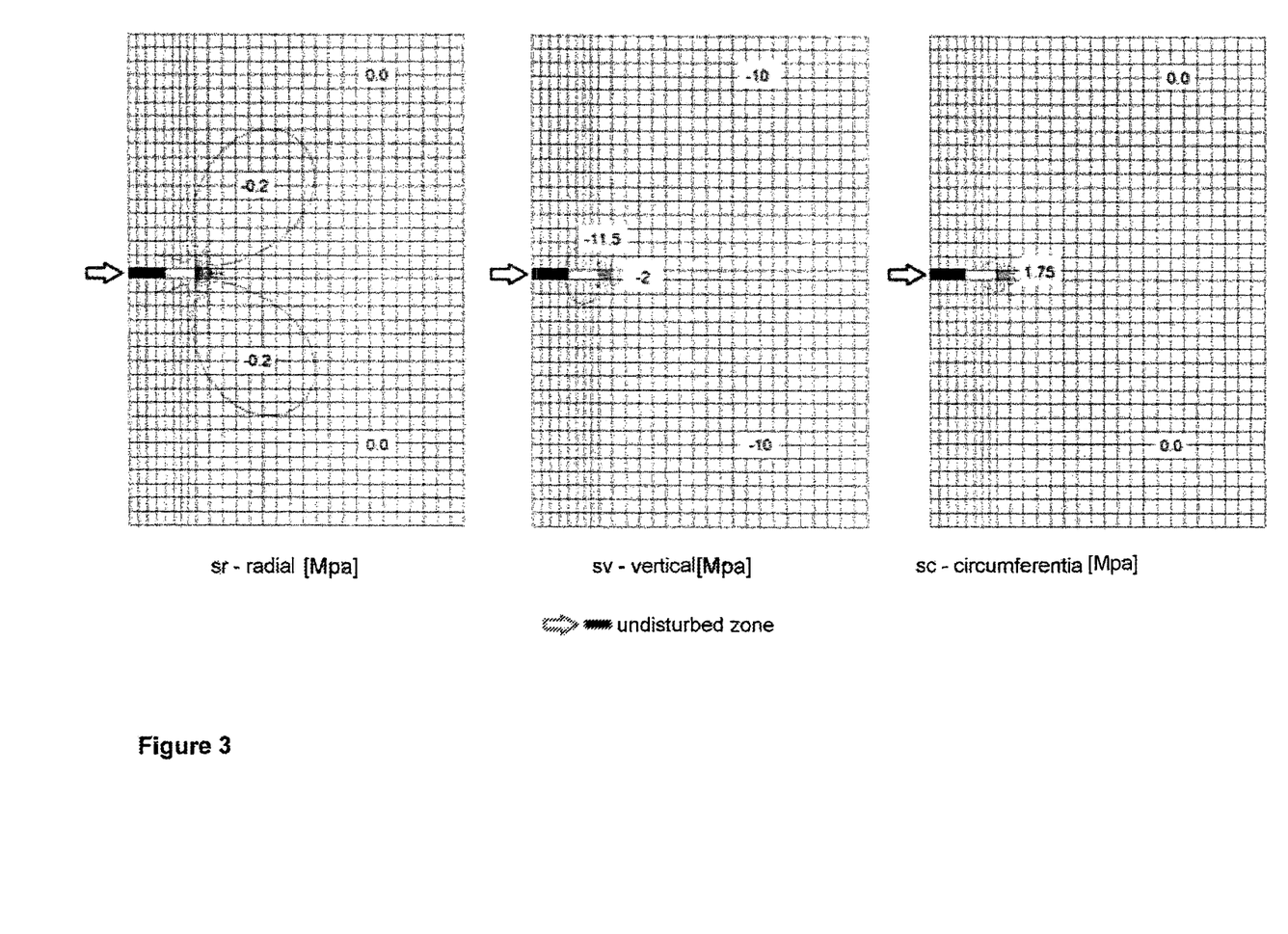
FIG. 3 shows the stresses generated by the external load P which are present over a portion of the cylindrical element shown in FIG. 2, obtained using any half-plane having the straight line YY as a generatrix.

This disturbance is shown in FIG. 3, where, assuming axial symmetry, it is possible to see the radial stresses Sr, vertical stresses Sv and circumferential stresses Sc present in the portion 2 of FIG. 2, sectioned in any half-plane originating from the straight line YY.

It can be seen that the three stresses generated by the uniformly distributed external load P are constant in space except for a zone close to the external periphery of the deformable body 10 where the deviations in the force lines and the above-described parasitic and undesirable viscous phenomena are concentrated.

As a function of the ratio R between the minimum dimension of the bases A and B and the height h1 of the deformable body 10, the disturbed zone ends up being spatially confined to a more or less extensive portion of the portion 2.

However, these disturbances are only relevant to the external cylindrical rim, labelled A1, of the deformable body 10 for an extension equal to a fraction of the radius (in the case of the cylindrical device presented in FIGS. 1 and 2, this extension is approximately ⅓ of the radius of the deformable body 10).

An internal zone of the deformable body 10, referred to as the undisturbed zone A2, can thus be identified, which remains undisturbed by said first-order and second-order viscous phenomena and thus subject to a stress Sv=SYY that is orthogonal to the faces A and B and proportional to the external actions alone (for example the load P).

In particular, the stress Sv=SYY that is orthogonal to the faces A and B is proportional to a combination of a plurality of deformations included in said undisturbed zone A2.

Referring to FIG. 1, the undisturbed zone A2 is preferably equal to a cylinder inside the deformable body 10, having a base having a diameter D2 of approximately 20 mm (see FIG. 1).

Preferably, said at least one deformation meter Ri is positioned at a distance h2 from at least one of said two surfaces A, B (see FIG. 2).

Furthermore, the distance h2 is greater than or equal to the dimension of the largest gas bubble that may be present in the agglomerate. In fact, this positioning of said deformation meter Ri makes it possible for the material of which the deformable body 10 is made to reduce the local disturbance brought about in the measurement by the gas bubbles in the agglomerate.

In particular, the deformation meter Ri is arranged equidistantly between the two faces A and B. Alternatively, the deformation meter Ri is arranged asymmetrically inside said deformable body, but keeping the minimum distance between a part thereof and the face A or B larger than said dimension of the largest gas bubble.

Preferably, the deformation meter Ri is a device comprising at least three electrical or optical extensometers.

In a preferred embodiment, the deformation meter Ri comprises at least three resistors (strain-gauge, piezoresistive, etc.) of which the deformation can easily be detected by monitoring the variations in electrical resistance. Alternatively or in addition, the deformation meter Ri may comprise a capacitive capacitor, the deformation of which can easily be detected by monitoring variations in capacitance.

These embodiments are intended to be exemplary and non-limiting, and can is be altered or replaced with similar deformation sensors by an expert in the field in a simple and routine manner so as to achieve the objects of the invention.

In a preferred embodiment the deformation meter Ri comprises three deformation sensors R1, R2, R3, individually oriented according to a predetermined set of three axes and suitable for measuring three deformations E1, E2, E3, from which the aforementioned stress SYY is calculated by combining said three deformations, which stress acts in the undisturbed zone A2 and is proportional to the combination of the three deformation measurements E1, E2, E3 and thus to only the applied external actions (for example the load P), and not influenced by the viscous phenomena brought about inside the deformable body 10.

In particular, the at least one deformation meter (Ri) comprises three deformation sensors (Rv, Rr, Rc), individually oriented according to a predetermined set of three orthogonals and suitable for measuring three deformations (Ev, Er, Ec) that are oriented orthogonally to one another and included in the undisturbed zone (A2), and the stress (SYY) is proportional to a combination of said three deformations (Ev, Er, Ec) oriented orthogonally to one another.

For example, assuming an axially symmetrical shape both of the interior of the portion 2 of the agglomerate and of the investigation device 1, and with a load P applied along the reference axis Y, the set of three orthogonals defined in accordance with the vertical, radial and circumferential universal cylindrical coordinates v, r, c also defines the orientations of the three vertical, radial and circumferential deformation sensors Rv, Rr, Re of the three corresponding vertical, radial and circumferential deformations Ev, Er, Ec and of the three vertical, radial and circumferential stresses Sv, Sr, Sc, respectively (see FIG. 2).

Further, in the axially symmetrical approximation used, the three vertical, radial and circumferential deformations Ev, Er, Ec are non-zero whilst the angled deformations Erv, Erc, Evc are zero or negligible. This means that the calculation of the axial stress SYY, coincident with the vertical stress Sv, is simplified by applying the linear resilient constitutive equation of the material of which the deformable body 10 is made, assuming an axially symmetrical state, in accordance with equation (1):

$$\begin{Bmatrix} SXX \\ SYY \\ SZZ \\ SXY \end{Bmatrix} = C \begin{bmatrix} 1-v & v & v & 0 \\ v & 1-v & v & 0 \\ v & v & 1-v & 0 \\ 0 & 0 & 0 & G/C \end{bmatrix} \cdot \begin{Bmatrix} EXX \\ EYY \\ EZZ \\ EXY \end{Bmatrix} \quad (1)$$

If it is desired to abandon the assumption of axial symmetry, the complete constitutive equation of the material has to be applied, using the six deformation and stress components, using a more complicated form of the equation, but obtaining substantially identical results (see equation 2).

$$\begin{Bmatrix} SXX \\ SYY \\ SZZ \\ SXY \\ SXZ \\ SYZ \end{Bmatrix} = C \begin{bmatrix} 1-v & v & v & 0 & 0 & 0 \\ v & 1-v & v & 0 & 0 & 0 \\ v & v & 1-v & 0 & 0 & 0 \\ 0 & 0 & 0 & G/C & 0 & 0 \\ 0 & 0 & 0 & 0 & G/C & 0 \\ 0 & 0 & 0 & 0 & 0 & G/C \end{bmatrix} \cdot \begin{Bmatrix} EXX \\ EYY \\ EZZ \\ EXY \\ EXZ \\ EYZ \end{Bmatrix} \quad (2)$$

wherein:

$$C = \frac{E}{(1+v)(1-2v)} \quad G = \frac{E}{2(1+v)}$$

where v is the Poisson's ratio and E is the Young's modulus. In both cases, equation 3 is obtained:

$$Sv = SYY = C[vEXX + (1-v)EYY + vEZZ] \quad (3)$$

By virtue of the investigation device 1 and the aforementioned features thereof, even if the model of the device is not axially symmetrical, it is possible to define an undisturbed zone A2 inside the deformable body 10 in which the stress Sv is proportional to only the applied external actions and is not influenced by the viscous phenomena generated inside the deformable body 10 or by the deviations in the force lines.

In this case, the calculations necessary to obtain the value of the stress require the use of the complete constitutive equation of the material of which the deformable body 10 is formed, as described above.

In a preferred application, if the applied external load P is constant, the aforementioned combination of equation 3 is constant, meaning that the value of SYY is also constant.

In a preferred embodiment, the deformable body 10 may comprise protrusions (not shown in the figure) so as to increase the bond between it and the structure of the agglomerate or cementitious mix.

In particular, the protrusions may be cylindrical or conical elements, having a complete or truncated spatial extension, positioned on the external surfaces of the deformable body 10 with a size suitable for rigidly engaging with the structure or the portion 2 of the agglomerate and reducing the possibility of displacement of the investigation device 1 once the casting of the agglomerate or cementitious mix is solidified above it.

In a preferred embodiment, a data-processing unit 20 is associated, via communication means, with the deformation meter Ri to calculate a combination of said deformations and to obtain the measurement of said stress Sv.

Preferably, said data-processing unit 20 is housed externally to the portion 2 of the agglomerate or internally to the deformable body 10, in order not to alter the mechanical elasticity and rigidity properties thereof.

In particular, the data-processing unit 20 is a microprocessor, a computer, a tablet, a smartphone, a server or similar devices which may be selected for achieving the object of the invention.

Preferably, the means of communication between the at least one deformation meter Ri and the data-processing unit 20 are wired connections, wireless connections (Wi-Fi, Bluetooth, etc.) or similar types which are easily identifiable by an expert in the field.

In one embodiment, the investigation device 1 may advantageously be installed within the agglomerate or cementitious mix structures before casting, in a rapid, effective and economical manner.

Preferably, this installation is aimed at guaranteeing that the investigation device 1 does not move (in rotation and/or translation) during the steps of casting the agglomerate or cementitious mix within a formwork so as to guarantee stably connected positioning and orientation of the investigation device 1 during the steps following the casting process, too.

In this way, in fact, it will be possible to provide the position of the sensor even during the cement maturation/ageing steps (in the case of a cementitious mix) during any transport and usage steps of the cementitious structure.

Preferably, the assembly is carried out using a support of the investigation device 1 suitable for being connected to parts of the armature or of the formwork and having the advantageous features set out in the following.

Preferably, the support is economical (since it will be left inside the casting), is solid and does not form a weak fragile point for the structure in which it is housed, is durable over time (it should not cause the structure in which it is housed to deteriorate by ageing), is rigid and does not disturb the normal static behaviour of the structure in which it is housed, does not interfere with and/or disturb the measurements carried out by the investigation device 1, is compact so as to be easily sold with the sensor and easily transportable, is robust so as to be able to guarantee that the sensor does not move during casting, does not obstruct the flow of the fresh concrete during casting, giving rise to gravel nests or other flaws in the casting, and is suitable for housing any other electronic devices which make it possible for the sensor to operate and/or communicate with the outside (for example batteries, electronic systems, antennae).

In one embodiment, said support is a network formed using electro-welded steel wires or zinc wires or painted wires or wires coated in plastics material or stainless steel wires or the like.

Advantageously, said network comprises wires, the diameter of which generally varies from 1 mm to 2 mm.

In one embodiment, the mesh of the network is square or rectangular, and can be customised, with a gauge of between 2 cm and 10 cm.

Preferably, the investigation device 1 is positioned within the support.

Also preferably, the investigation device 1 is positioned within a mesh of said network so as to maintain a predefined position and orientation during the cement forming steps and during the phases subsequent thereto.

In one embodiment, the investigation device 1 can be fixed to the network using any industrially applicable anchoring system suitable for connecting said device 1 to the network.

Preferably, the support system contains at least one electrical wire suitable for supplying said device with power and/or transferring the data acquired by the investigation device 1 to provided processing units that can be operatively connected.

In one embodiment, the investigation device is connected to the network via a housing device so as to connect the investigation device 1 by engaging by interference, following resilient deformation, on predetermined seats which can be spaced apart in a reversible manner following application of a force which brings about resilient deformation thereof.

Preferably, said housing device is made of polymer material.

In one embodiment, once the investigation device and optionally a power supply/signal wire are fixed to the metal network, said network can easily be fixed to an armature cage of the structures or to the formwork thereof.

Advantageously, the network is formed having armature bars having a diameter of 4, 6, 8, 10 or 12 mm (particularly in the absence of an armature arranged in the formwork).

In one embodiment, a temperature and/or humidity sensor is contained in the investigation device 1.

Preferably, the temperature and/or humidity sensor is housed outside the investigation device 1.

Advantageously, said temperature and/or humidity sensors are suitable for measuring the temperature and humidity of the concrete so as to obtain useful information about the maturation/ageing of the concrete at specific time intervals (typically days) subsequent to carrying out the casting.

Preferably, the temperature sensor is a thermistor or thermocouple or similar digital device.

Preferably, the humidity sensor is a hygrometer suitable for calculating the variation in humidity by way of variations in electrical capacitance or resistance or the like.

In one embodiment, the temperature and/or humidity sensor is inserted into an airtight box.

Advantageously, said airtight box is made of polymer material.

Preferably, the power-supply systems, an operating unit (microcontroller) and wired or wireless data-transfer means operatively connected to one another and/or to said temperature and/or humidity sensors, are housed inside the airtight box.

The applicant has in fact confirmed that it is particularly useful to know the maturation/ageing of the concrete so as to be able to know, monitor and optionally modify the setting speed of said material. In fact, said investigation parameters provide important information which can be associated with the development over time and/or in space of the internal mechanical resistances of the concrete.

By virtue of this technical solution, it is thus possible to control the maturation/ageing process continuously and effectively, optionally by modifying the humidity and temperature at which the setting and hardening of the material take place on the days subsequent to casting: in this way, it becomes possible to obtain higher-quality cementitious (less porous, less micro-fissured, more resistant and uniform in behaviour) using the same initial reagents (sand, gravel, cement, additives).

The modes of operation of the investigation device 1, defining the method of the present invention, comprise the steps described in the following.

An assigned operator prepares, at one or more points of a structure of an agglomerate including a binder and a bonded substance, at least one investigation device 1 capable of measuring at least three deformations oriented relative to one another on three axes.

Subsequently, the corresponding at least three deformation measurements E1, E2, E3 are obtained at each of said points.

Advantageously, the corresponding at least three deformation measurements E1, E2, E3 at each of said points are at least three deformation measurements E1, E2, E3 of the investigation device 1.

Preferably, the corresponding at least three deformation measurements E1, E2, E3 at each of said points are at least three deformation measurements E1, E2, E3 of the deformable body 10.

As set out above, the at least three deformation measurements E1, E2, E3 are deformations of the investigation device 1 caused by the agglomerate or cementitious mix structure for which said investigation device operates as a filter/screen for any viscoelastic contributions present.

At this point, a stress SYY proportional to a combination of said at least three deformation measurements E1, E2, E3 is calculated at the corresponding point.

In another preferred embodiment of said method, the following steps are carried out.

An assigned operator identifies in the structure being monitored the points at which the investigation devices 1 are to be placed.

Subsequently, at least one investigation device 1 is provided, comprising:

a) a deformable body 10 having resilient behaviour, at least in the context of the admissible strain in said agglomerate structure, b) said deformable body 10 having two surfaces A and B, the smaller dimension of which is greater than or equal to the maximum nominal diameter of the bonded substance or inert substance used in the agglomerate, and a shape that is flattened with respect to two predominant dimensions.

At this point the at least one investigation device 1 is placed in the position and orientation identified.

Subsequently, a casting of the agglomerate is made that completely encapsulates the at least one investigation device 1.

Thus, said at least three deformation measurements E1, E2, E3 oriented relative to one another within an undisturbed zone A2 of said deformable body 10, are detected inside said deformable body 10 of said investigation device 1.

At this point, the stress SYY that is proportional to a combination of the at least three deformation measurements E1, E2, E3 and is present in the undisturbed zone A2 of the deformable body 10 is calculated.

Preferably, within the undisturbed zone A2 of the deformable body 10, at a distance greater than or equal to h2 from the faces A and B, the at least three deformation measurements E1, E2, E3 oriented relative to one another are measured. In a preferred embodiment of said method, the at least three deformation measurements E1, E2, E3 are oriented orthogonally to one another.

In particular, within the undisturbed zone A2 of the deformable body 10, at least one deformation meter Ri is arranged, said deformation meter being able to measure the at least three deformation measurements E1, E2, E3 at a distance from the faces A and B that is greater than or equal to h2.

In a preferred embodiment, the three deformation measurements E1, E2, E3 are measured using three deformation sensors R1, R2, R3 operatively connected to a data-processing unit 20.

At this point, using a combination of said at least three deformation measurements E1, E2, E3, the stress SYY present in the undisturbed zone A2 in said deformable body 10 is calculated.

Preferably, the calculations relating to the constant stress SYY are implemented by the data-processing unit 20.

In a preferred embodiment, said method continues with the steps set out in the following.

A user assigned to the control monitors the progression over time of the calculated stress SYY so as to detect any alterations therein due to external actions applied to said agglomerate structure and/or due to damage to the structure itself.

In a particular case, the external actions applied are the load P applied to the agglomerate structure.

Furthermore, the user assigned to the control may be a physical person, the data-processing unit 20 itself (PC, tablet, server, etc.) or an archiving unit suitable for recording the progression over time of the stress SYY.

Subsequently, the user assigned to the control activates an alarm message when the calculated stress SYY varies beyond a predefined tolerance by a previously set threshold value.

For example, the predefined tolerance is a value equal to 10% of the value of the threshold stress considered critical for said agglomerate according to specific calculations to be made for each individual structure.

In this way, it is potentially possible to identify, in real time, variations in the external actions and/or in the structure with respect to the initial conditions which may be particularly dangerous for the integrity of said structure.

By virtue of the features of the invention, the method and the investigation device 1 for measuring stresses in an agglomerate structure can detect variations in the external actions applied or variations in the structure (linked to deterioration, damage, ageing, tampering, etc.) and optionally activate alarm messages when critical thresholds set at the time of installing the system or at any moment subsequent thereto are exceeded.

Naturally, an expert in the field can bring further modifications and variants to the above-described invention with the aim of meeting specific contingent application requirements, the modifications and variants still falling within the scope of protection as defined in the following claims.

The invention claimed is:

1. Method for measuring stresses in an agglomerate structure including a binder and a bonded substance which take on a fluid form in a first step of use and in a second step solidifies to take on the form and features of a solid, comprising the steps of:
   providing, at a plurality of points on said structure, at least one investigation device able to measure at least three deformations oriented relative to one another on three axes,
   detecting the corresponding at least three deformation measurements at each of said points,
   calculating a stress that is proportional to a combination of said at least three deformation measurements at the corresponding point,
   identifying, in the structure to be produced from said agglomerate, a position and orientation of at least one investigation device to be installed,
   providing said at least one investigation device, which comprises:
      a deformable body having resilient behaviour, at least in the context of the admissible strains in said agglomerate structure, and
      said deformable body having two surfaces, the smaller dimension of which is greater than or equal to the maximum nominal diameter of said bonded substance used in said agglomerate and a shape that is flattened with respect to two predominant dimensions,
   placing said at least one investigation device in the position and orientation identified,
   making a casting of said agglomerate that completely encapsulates said at least one investigation device,
   detecting, inside said deformable body of said investigation device, said at least three deformation measurements oriented relative to one another, within an undisturbed zone of said deformable body, and
   calculating said stress that is proportional to a combination of said at least three deformation measurements and present in said undisturbed zone of the deformable body.

2. Method according to claim 1, comprising the steps of monitoring the trend over time of the calculated stress for the purposes of detecting any changes thereto due to variations in external actions applied to said agglomerate structure and/or damage to said structure.

3. Method according to claim 1, comprising the step of activating an alarm message when said calculated stress varies beyond a predefined tolerance by a pre-set threshold value.

4. Method according to claim 1, wherein said agglomerate is a cementitious mix.

5. Investigation device that can be connected to an agglomerate structure including a binder and a bonded substance which takes on a fluid form in a first step of use and in a second step solidifies to take on the form and features of a solid, comprising:
   a deformable body inside which at least one deformation meter is arranged, said deformation meter being able to detect within an undisturbed zone at least three deformation measurements that are oriented relative to one another such that a stress inside said deformable body is proportional to a combination of said three deformation measurements.

6. Investigation device according to claim 5, wherein:
   said deformable body has resilient behaviour, at least in the context of the admissible strain in said structure of said agglomerate,
   said deformable body comprises two surfaces, the smaller dimension of which is greater than or equal to the maximum nominal diameter of said bonded substance present within said agglomerate, and has a shape that is flattened with respect to two predominant dimensions so as to produce inside said deformable body a zone undisturbed by said stress, in which said at least one deformation meter is arranged.

7. Investigation device according to claim 6, wherein said flattened shape of said deformable body has development according to a prismatic or cylindrical or laminar model, and wherein an aspect ratio between the smaller measurement of said two surfaces and a height of said prismatic or cylindrical or laminar model is within a predetermined range of values.

8. Investigation device according to claim 7, wherein said aspect ratio is greater than 10.

9. Investigation device according to claim 7, wherein said at least one deformation meter is positioned at a distance from at least one of said two surfaces.

10. Investigation device according to claim 5, wherein said deformable body has a modulus of elasticity that is strictly greater than that of said agglomerate structure.

11. Investigation device according to claim 5, wherein:
    said at least three deformation measurements oriented relative to one another are present within said undisturbed zone and said stress is proportional to a combination of said three deformation measurements.

12. Investigation device according to claim 5, wherein said at least one deformation meter comprises three deformation sensors, individually oriented as a predetermined orthogonal triplet, capable of measuring three deformations oriented orthogonally to one another, which are within said undisturbed zone, and said stress being proportional to a combination of said three deformation measurements oriented orthogonally to one another.

13. Investigation device according to claim 5, wherein said deformable body comprises protuberances and/or recesses so as to increase the constrains between said deformable body and the structure of said agglomerate.

14. Investigation device according to claim 5, wherein said agglomerate is a cementitious mix.

15. Investigation device according to claim 5, comprising a temperature and/or humidity sensor.

\* \* \* \* \*